(12) United States Patent
Wooster et al.

(10) Patent No.: US 10,012,784 B1
(45) Date of Patent: Jul. 3, 2018

(54) TILED LIGHT GUIDE WITH DEFLECTION STRUCTURES

(71) Applicants: Roland P. Wooster, Folsom, CA (US); Jun Jiang, Portland, OR (US); Zhiming Zhuang, Sammamish, WA (US); Duncan Glendinning, Chandler, AZ (US)

(72) Inventors: Roland P. Wooster, Folsom, CA (US); Jun Jiang, Portland, OR (US); Zhiming Zhuang, Sammamish, WA (US); Duncan Glendinning, Chandler, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 15/474,930

(22) Filed: Mar. 30, 2017

(51) Int. Cl.
*G02F 1/1333* (2006.01)
*F21V 8/00* (2006.01)

(52) U.S. Cl.
CPC ......... *G02B 6/0045* (2013.01); *G02B 6/0055* (2013.01); *G02B 6/0056* (2013.01); *G02F 1/1333* (2013.01)

(58) Field of Classification Search
None
See application file for complete search history.

(56) References Cited

U.S. PATENT DOCUMENTS

| 6,144,162 | A | 11/2000 | Smith |
| 2004/0001040 | A1 | 1/2004 | Kardach et al. |
| 2016/0377797 | A1* | 12/2016 | Sundaram ............ G02B 6/0068 345/102 |

OTHER PUBLICATIONS

U.S. Appl. No. 15/201,360, filed Jul. 1, 2016, Glendinning et al.

* cited by examiner

*Primary Examiner* — Phu Vu
(74) *Attorney, Agent, or Firm* — Womble Bond Dickinson (US) LLP (57) ABSTRACT

Techniques and mechanisms for providing illumination of a display. In an embodiment, a light guide includes a first portion to receive light, a second portion to output some or all of the light, and a third portion configured to propagate the light between the first portion and the second portion. The third portion forms a first deflection structure which adjoins, and extends between, respective surface regions of the first portion and the second portion. A light source is coupled to provide edgewise illumination of the light guide via the first portion. In another embodiment, the light propagates through the third portion and into a region, between two parallel planes, in which the second portion is located.

21 Claims, 8 Drawing Sheets

TILED LIGHT GUIDE WITH DEFLECTION STRUCTURES

BACKGROUND

1. Technical Field

Embodiments herein generally relate to image display technology and more particularly, but not exclusively, to a light guide for providing illumination to a pixel array.

2. Background Art

Some modern displays utilize light emitting diode (LED) technology as a light source. For example, a liquid crystal display (LCD) may use LEDs as a light source. In general, a number of LEDs are provided in a strip along with a light guide panel to channelize and diffuse the light emitted from the LEDs. LEDs and the light guide panel are combined with other display layers to form an LED edge lit LCD display. Such LED edge lit displays can be incorporated into a standalone display or into an all in one computing device, such as, for example, a smart phone, a personal computer (PC), a television (TV), or the like. Some applications provide segmented illumination of the display panel. More particularly, portions of the display panel can be individually illuminated. However, with respect to such segmented illumination devices; the number of portions with which the display can be segmented is limited to a 2×N array to maintain backlight thickness within device constraints. These constraints are significant as modern trends continue to require greater numbers of regions in segmented displays along with thinner and thinner devices.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed herein variously include techniques and/or mechanisms to facilitate illumination using a space efficient light guide. As used herein, "light guide" refers to a contiguous body of light transmissive material which is configured to receive light at one region and to output some of all of the light via another region. In various embodiments, a light guide includes two portions, where respective surfaces of such two portions are offset from or angled to one another. The two portions may have generally planar geometries—e.g., wherein opposite sides of a given portion extend each in a respective one of two parallel planes. In such an embodiment, a third portion of the light guide may form a deflection structure between the two portions.

As used herein, "deflection structure" (or, for brevity, simply "deflection") refers to a structure, a surface of which is disposed between two adjoining surface regions, where the two adjoining surface regions face respective directions which are at a non-zero angle to one another. For example, a deflection structure may include two surfaces which are opposite each other, where for each of the two surfaces, the surface is disposed between two surface regions which are at a non-zero angle to one another. Opposite sides of a deflection structure may be conformal to one another at least in part—e.g., wherein a direction of deflection is the same for both of the sides. In an embodiment, a deflection structure includes an angled surface (e.g., a surface corner) or a curve surface.

The technologies described herein may be implemented in one or more electronic devices. Non-limiting examples of electronic devices that may utilize the technologies described herein include any kind of mobile device and/or stationary device, such as cameras, smart phones, computer terminals, desktop computers, laptop computers (e.g., netbook computers, notebook computers), tablet computers, electronic readers, facsimile machines, kiosks, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including a light guide which forms a deflection structure.

Figure 1:
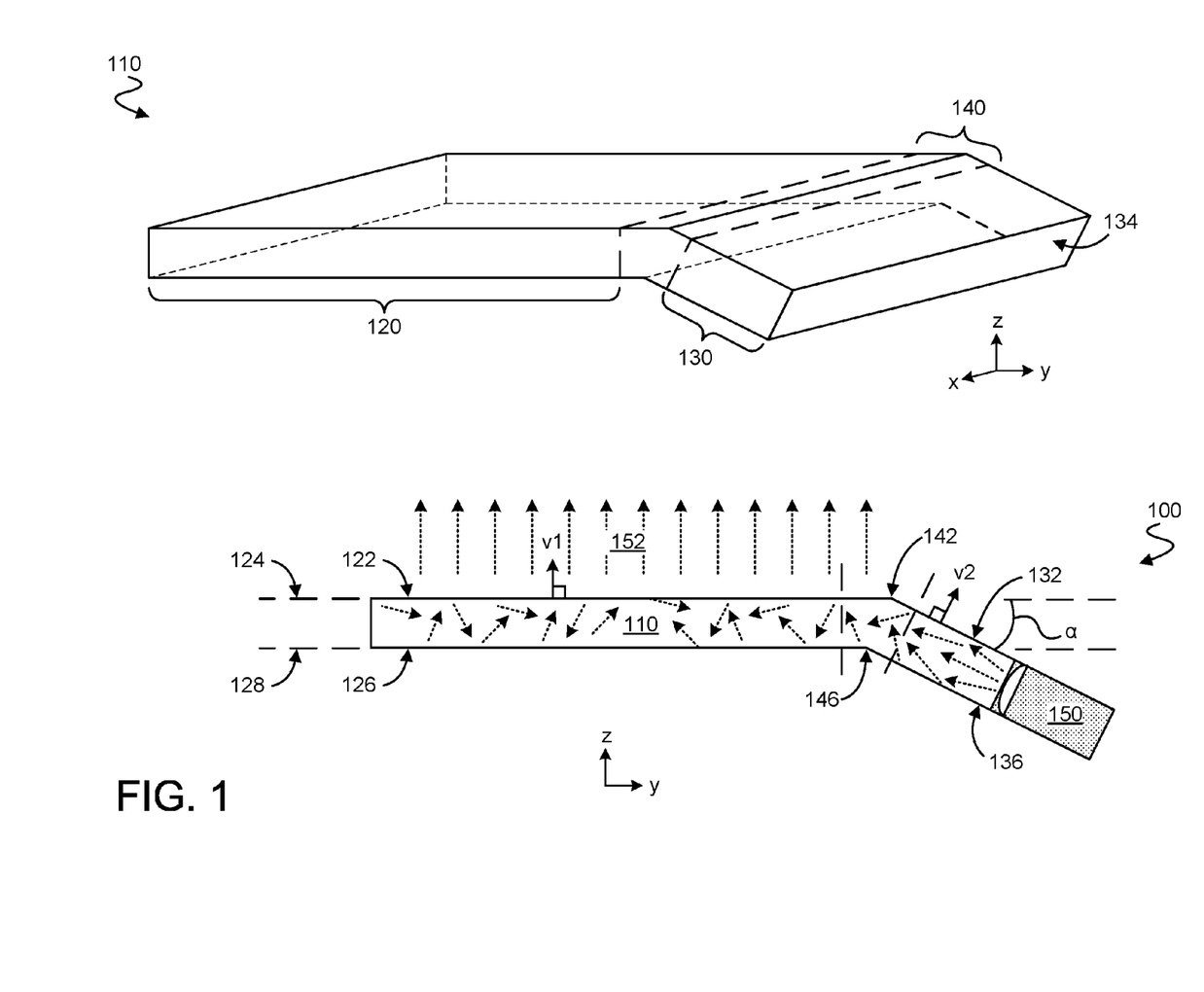
FIG. 1 shows perspective and side views each of a system to direct light in a light guide according to an embodiment.

FIG. 1 shows features of a system 100 to provide illumination for a display according to an embodiment. System 100 is one example of an embodiment wherein a light guide is configured receive edgewise illumination from one direction and to output light in another direction, wherein the light guide forms a deflection structure in a region through which such light is to propagate. In the illustrative embodiment shown, system 100 includes a light guide 110 and one or more light sources (e.g., including the illustrative light source 150 shown) optically coupled thereto. Light source 150 may comprise one or more light emitting diodes (LEDs). However, any of a variety of conventional light sources may be adapted in some embodiments, which are not limited as to a particular type of light source 150 for operating with light guide 110.

Light guide 110 may comprise any of a variety of light transmissive materials suitable to receive and direct light from light source 150. Examples of such materials include, but are not limited to, glass and any of various acrylics such as polymethylmethacrylate (PMMA) and/or the like—e.g., where the light transmissive material is adapted, for example, from conventional backlit, edge lit and/or other display technologies. Due at least in part to a physical configuration of light guide 110, some or all such light may be output from a surface region of light guide 110—e.g., to facilitate illumination of a pixel array (not shown) that is included in or is to be coupled to system 100. In providing a deflection structure of light guide 110, some embodiments variously enable an efficient placement of one or more light sources in a region other than an extreme edge of an assembly including multiple light guides (or "light guide assembly").

For example, as illustrated by the perspective view shown in FIG. 1, light guide 110 may include two portions 120, 130 and another portion 140 which is disposed therebetween. Portion 120 may comprise a surface region 122 and another surface region 126 which is opposite surface region 122. Portion 120 may have a generally planar geometry. For example, surface regions 122, 126 may extend each in a different respective one of two parallel planes (such as the illustrative planes 124, 128 shown), wherein a thickness (z-axis dimension) of portion 120 between surface regions 122, 126 is less than each of a width (x-axis) and a length (y-axis dimension) of portion 120.

In such an embodiment, portion 130 may comprise a surface region 132 and another surface region 136 which is opposite surface region 132. Similar to portion 120, portion 130 may have a generally planar geometry—e.g., wherein surface regions 132, 136 variously extend each in a different respective one of two parallel planes. Such surface regions 132, 136 may each form a non-zero angle with one or both of planes 124, 128. For example, a vector v1, normal to surface region 122, may be at non-zero angle to another vector v2 which is normal to surface region 132.

Portion 140 may form one or more deflection structures between portions 120, 130. For example, a surface region 142 of portion 140 may adjoin each of surface regions 122, 132 and form a deflection (e.g., an angled corner) between surface regions 122, 132. Alternatively or in addition, another surface region 146 of portion 140 (the surface region 146 opposite surface region 142) may adjoin each of surface regions 126, 136 and form another deflection between surface regions 126, 136. In one embodiment, each of surface regions 142, 146 provides the same overall angle of deflection.

Portion 130 may accommodate optical coupling with light source 150. By way of illustration and not limitation, one or more light sources may be arranged to direct light edgewise into a facet or other such input structure (e.g., such as the illustrative edge 134 which extends between surface regions 132, 136). Portion 120 may be configured to output from surface region 122 at least a portion of such light, as represented by the illustrative light 152.

Light guide 110 may be configured to promote consistency, across surface region 122, of the strength of light 152 and/or a direction of propagation by light 152. For example, light source 150 may initially input via edge 134 light which primarily propagates in one or more directions that are each parallel to, or at a shallow angle to, one of surface regions 132, 136. As such light propagates along portion 130 and toward portion 140, some or all of it may variously reflect off of one or both of surface regions 132, 136. Alternatively or in addition, some or all of the light may enter portion 140 and reflect off of one or both of sides 142, 146. As a result, light may be increasingly varied in its respective directions of propagation as such light travels from light source 150 through portions 130, 140 and toward portion 120. When propagating in portion 120, light may variously reflect off of one or more surfaces thereof (e.g., including one or both of surface regions 122, 126) until portions of such light is output from surface region 122 as light 152.

Reflection of light within light guide 110 may, for example, be due at least in part to an index or refraction of a light transmissive material of light guide 110—e.g., where such an index or refraction results in at least some total internal reflection. In some embodiments, light reflection may be additionally or alternatively due to one or more surface regions—e.g., including one or more of surface regions 132, 136, 142, 146 and 126—being silvered or otherwise coated with a material that promotes reflection of light from such surface regions back into light guide 110. The coating of such surface regions may use any of a variety of reflective materials that, for example, are adapted from conventional techniques for providing a light transmissive structure.

In an illustrative scenario according to one embodiment, a width (x-axis) of portion 120 is in a range of 0.5 inches to 2.0 inches—e.g., wherein a length (y-axis) of portion 120 is in a range of 1.0" to 3.0" and wherein a thickness (z-axis) of portion 120 is in a range of 0.3 millimeters (mm) to 6 mm. In such an embodiment, a width (x-axis) of portion 130 may also be in a range of 0.5 inches to 2.0 inches—e.g., wherein a length of portion 130 is in a range of 0.5 inches to 1.0 inches and wherein a thickness of portion 130 is in a range of 0.3 mm to 6 mm. An overall thickness of light guide 110 may be in a range of 0.5 mm to 20 mm, for example. Alternatively or in addition, a non-zero angle of deflection a from plane 124 by surface region 132 (and/or a non-zero angle of deflection from plane 128 by surface region 136) may be less than ninety degrees (90°). However, such dimensions of portions 120, 130 are merely illustrative, and may vary in different embodiments based on implementation-specific details. The relative widths, lengths and thicknesses of portions 120, 130, 140, the angle of deflection provided by portion 140, etc. are merely illustrative, and may vary according to implementation specific details.

Figure 2:
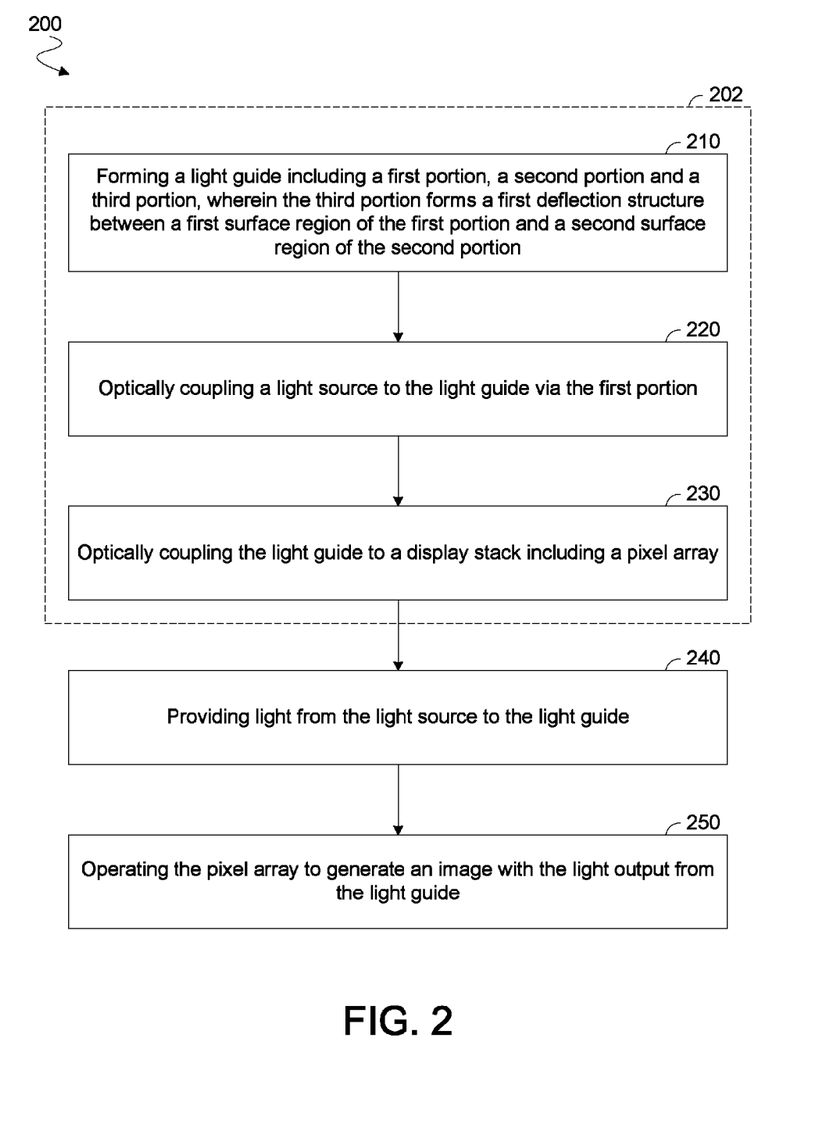
FIG. 2 is a flow diagram illustrating elements of a method to provide functionality of a light guide according to an embodiment.

FIG. 2 shows features of a method 200 to provide functionality for redirecting light according to an embodiment. Method 200 may be performed to provide functionality of system 100, for example. In one embodiment, method 200 includes operations 202 to provide light guide structures and/or optical coupling with such light guide structures. For example, operations 202 may include, at 210, forming a light guide including a first portion, a second portion and a third portion (e.g., portions 130, 120, 140, respectively), wherein the third portion forms a first deflection structure which adjoins, and extends between, a first surface region of the first portion and a second surface region of the second portion. A first direction of a first vector normal to the first surface region may be oblique to, or opposite to, a second direction of a second vector normal to the second surface region. For example, the first vector and second vector may be v2 and v1, respectively, in FIG. 1.

The forming at 210 may include injection molding, extruding, casting, heating, bending, cutting, machining, polishing and/or otherwise processing a light transmissive material to form one or more deflection structures having features described herein. The first deflection structure may, for example, include a corner which forms an obtuse angle. In some embodiments, the first deflection structure includes a curve—e.g., wherein the curve forms a one hundred and eighty degree (180°) bend.

The forming at 210 may comprise forming a second deflection structure of the third portion, where the second deflection structure adjoins and extends between a third surface region of the first portion and a fourth surface region of the second portion. In such an embodiment, a third direction of a third vector normal to the third surface region may be oblique to, or opposite to, a fourth direction of a fourth vector normal to the fourth surface region. For example, portion 140 may further form at surface region 142 a corner (or alternatively, a curve) which extends between, and adjoins each of, surface regions 122, 132.

In some embodiments, the second surface region extends in a first plane and a third surface region of the second portion extends in a second plane parallel to the first plane, wherein a sidewall surface of the second portion extends between the first plane and the second plane. In such an embodiment, the sidewall surface may be curved or oblique to the first plane. As described herein with reference to FIGS. 6A, 6B, the angling and/or curving of such a sidewall surface may facilitate a conformal fit between adjoining light guides in an assembly of multiple light guides.

In some embodiments, operations 202 further includes operations (not shown) to deposit a reflective coating on one or more surface regions of the light guide. For example, one or more surface regions of the first portion—e.g., including surfaces at opposite sides of the first portion—may each have a respective reflective coating disposed thereon. Alternatively or in addition, one or more surface regions of the third portion—e.g., including surfaces at opposite sides of the third portion—may each have a respective reflective coating disposed thereon.

In an embodiment, operations 202 additionally or alternatively provide optical coupling of a light guide such as that which is formed at 210. For example, operations 202 may comprise, at 220, optically coupling a light source to the light guide via the first portion. The coupling at 220 may result in the second portion of the light guide being optically coupled to output from the light guide light which is provided by the light source. Although some embodiments are not limited in this regard, operations 202 may comprise, at 230, optically coupling the light guide to a display stack including a pixel array.

Method 200 may additionally or alternatively include the operation of a display which includes light guide structures such as those provided by operations 202. For example, method 200 may comprise, at 240, providing light from the light source to the light guide. In such an embodiment, method 200 may further comprise, at 250, operating the pixel array to generate an image with light output from the second portion of the light guide.

Figure 3:
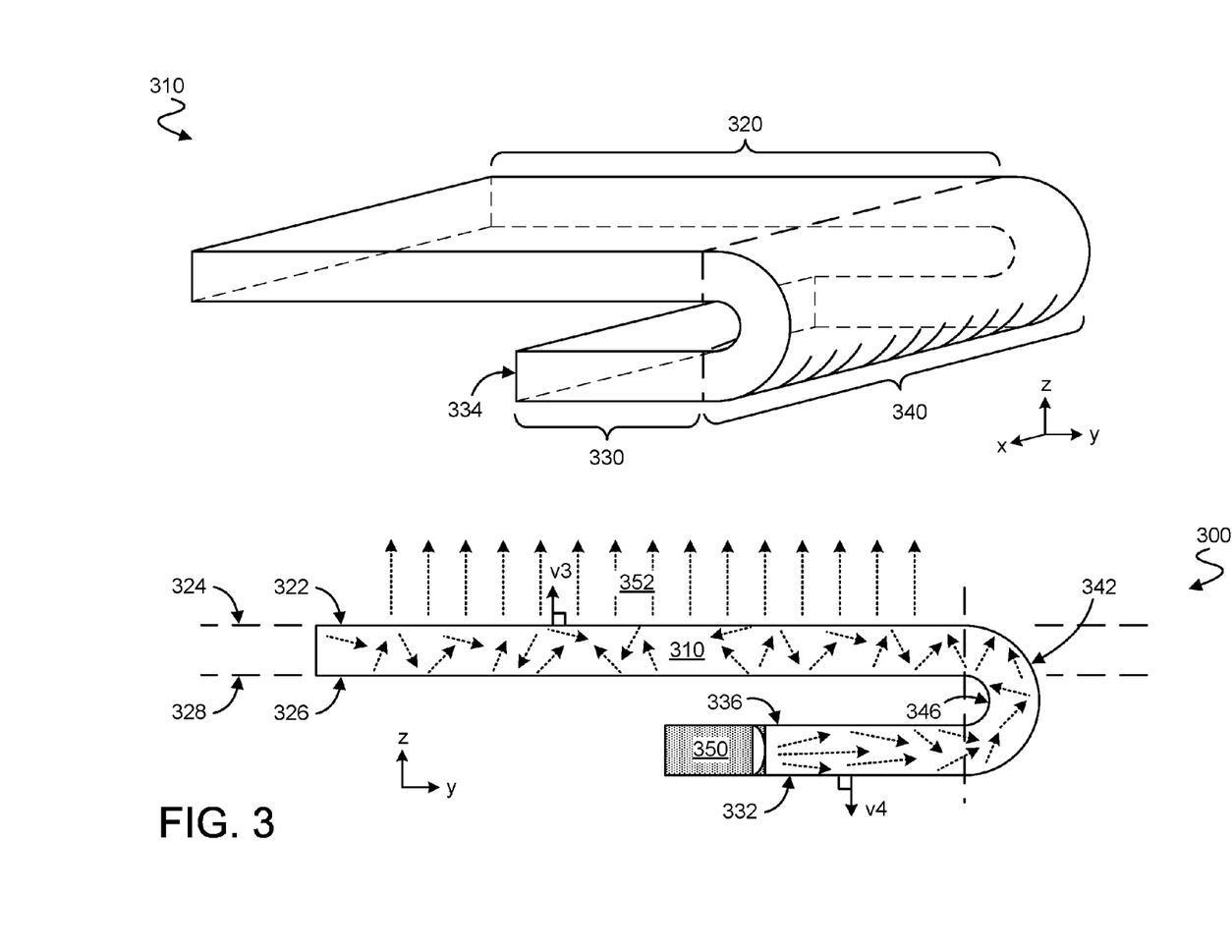
FIG. 3 shows perspective and side views each of a system to direct light in a light guide according to an embodiment.

FIG. 3 shows features of a system 300 for redirecting light according to another embodiment. Functionality of system 300 may be provided by operations of method 200, for example. In an embodiment, system 300 includes some features of system 100.

System 300 is one example of an embodiment including a light guide which forms a deflection structure including one or more curved surfaces. Such curved surfaces may be distinguished, for example, from angled corner surfaces such as those provided by the respective deflections at surface regions 142, 146. In the illustrative embodiment shown, system 300 includes a light guide 310 and one or more light sources (e.g., including the illustrative light source 350 shown) optically coupled thereto. Light guide 310 and light source 350 may correspond functionally to light guide 110 and light source 150, respectively. For example, light guide 310 may include portions 320, 330, 340 that correspond functionally to portions 120, 130, 140, respectively.

Light guide 310 may comprise any of a variety of light transmissive materials suitable to receive and direct light from light source 350. As illustrated by the perspective view shown in FIG. 3, portion 320 may comprise a surface region 322 and another surface region 326 which is opposite surface region 322. Portion 320 may have a generally planar geometry. For example, surface regions 322, 326 may extend each in a different respective one of two parallel planes (such as the illustrative planes 324, 328 shown), wherein a thickness (z-axis dimension) of portion 320 between surface regions 322, 326 is less than each of a width (x-axis) and a length (y-axis dimension) of portion 320. In such an embodiment, portion 330 may comprise a surface region 332 and another surface region 336 which is opposite surface region 332. Similar to portion 320, portion 330 may have a generally planar geometry—e.g., wherein surface regions 332, 336 variously extend each in a different respective one of two parallel planes.

Portion 340 may form one or more deflection structures between portions 320, 330. For example, a surface region 342 of portion 340 may extend between, and adjoin each of, surface regions 322, 332, wherein surface region 342 forms a deflection structure (e.g., a curve) between surface regions 322, 332. Alternatively or in addition, another surface region 346 of portion 340 (the surface region 346 opposite surface region 342) may adjoin each of surface regions 326, 336 and form another curved deflection between surface regions 326, 336. In the example embodiment shown, portion 340 provides one or more 180° bends between portions 320, 330—e.g., where surface regions 322, 332 are parallel to each other and/or surface regions 326, 336 are parallel to each other. For example, a vector v3, normal to surface region 322, may face a direction which is opposite to that of another vector v4 normal to surface region 332. Some embodiments are not limited to a particular overall angle of deflection that might be provided by surface region 342 or by surface region 346. For example, a deflection structure (e.g., forming a curve or a corner structure) may provide any of a variety of other non-zero angles of deflection, in different embodiments.

Portion 330 may accommodate optically coupling with light source 350. By way of illustration and not limitation, one or more light sources may be arranged to direct light into the illustrative side 334 which extends between surface regions 332, 336. Portion 320 may be configured to output from surface region 322 at least a portion of such light, as represented by the illustrative light 352. Light guide 310 may be configured to promote consistency, across surface region 322, of the strength of light 352 and/or a direction of propagation by light 352.

Figure 4:
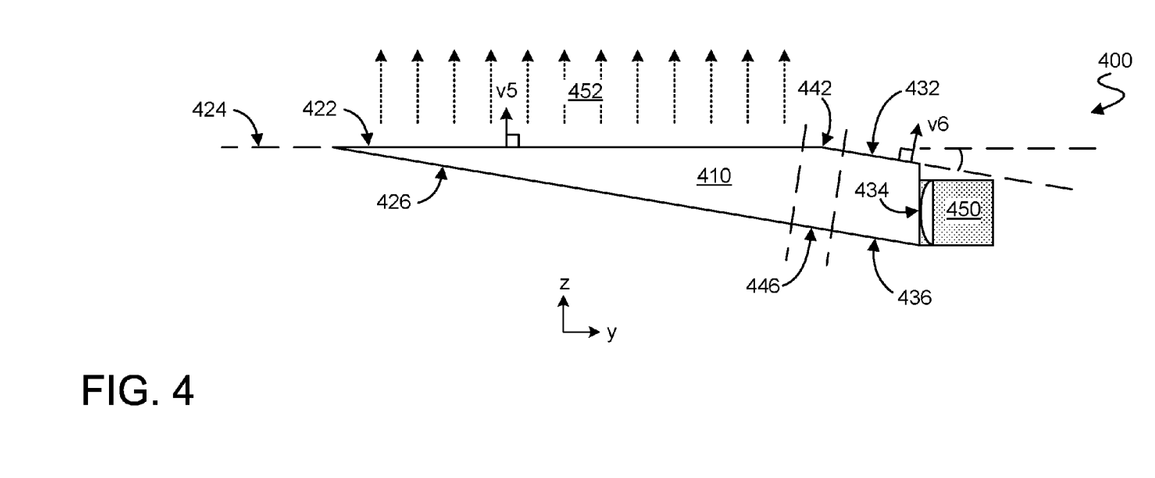
FIG. 4 is a side view of a system to direct light in a light guide according to an embodiment.

FIG. 4 shows features of a system 400 for redirecting light according to another embodiment. Functionality of system 400 may be provided by operations of method 200, for example. In an embodiment, system 400 includes some features of system 100. System 400 is one example of an embodiment including a light guide which forms a deflection structure (in this example, a corner) at only one side thereof. In the illustrative embodiment shown, system 400 includes a light guide 410 and at least one light source 450 optically coupled thereto. Light guide 410 and light source 450 may correspond functionally to light guide 110 and light source 150, respectively. For example, light guide 410 may include three portions that correspond functionally to portions 120, 130, 140.

As illustrated in FIG. 4, a generally wedge-shaped output portion of light guide 410 may comprise surface regions 422, 426 which extend in respective planes that are oblique to one another (e.g., where surface region 422 extends in a plane 424). In such an embodiment, an input portion may comprise a surface region 432 and another surface region 436 which is opposite surface region 432. The input portion may have a generally planar geometry—e.g., wherein surface regions 432, 436 variously extend each in a different respective one of two parallel planes.

A deflector portion of light guide 410—the deflector portion disposed between the input portion and the output portion—may form a deflection structure between surface regions 422, 432. For example, a surface region 442 of the deflector portion may extend between, and adjoin each of, surface regions 422, 432, wherein surface region 442 forms a corner between surface regions 422, 432. Another surface region 446 of the deflector portion (where surface regions 442, 446 are on opposite sides of the deflector portion) may omit any deflector structure. For example, surface regions 426, 436, 446 may adjoin and be flush with one another.

The input portion of light guide 410 may accommodate optically coupling with light source 450. By way of illustration and not limitation, one or more light sources may be arranged to direct light into a side 434 which extends between surface regions 432, 436. The output portion of light guide 410 may be configured to output from surface region 422 at least a portion of such light, as represented by the illustrative light 452. In the example embodiment shown, the deflector portion of light guide 410 forms a corner between surface regions 422, 432—e.g., wherein a vector v5, normal to surface region 422 is oblique to another vector v6 normal to surface region 432. Side 434 may be perpendicular to or otherwise at an angle to surface region 432 and, in some embodiments, may be perpendicular to plane 424. In such an embodiment, any surface region of side 434 which is to receive light from light source 450 may be offset (e.g., along the z-axis shown) from the plane 424.

Figure 5:
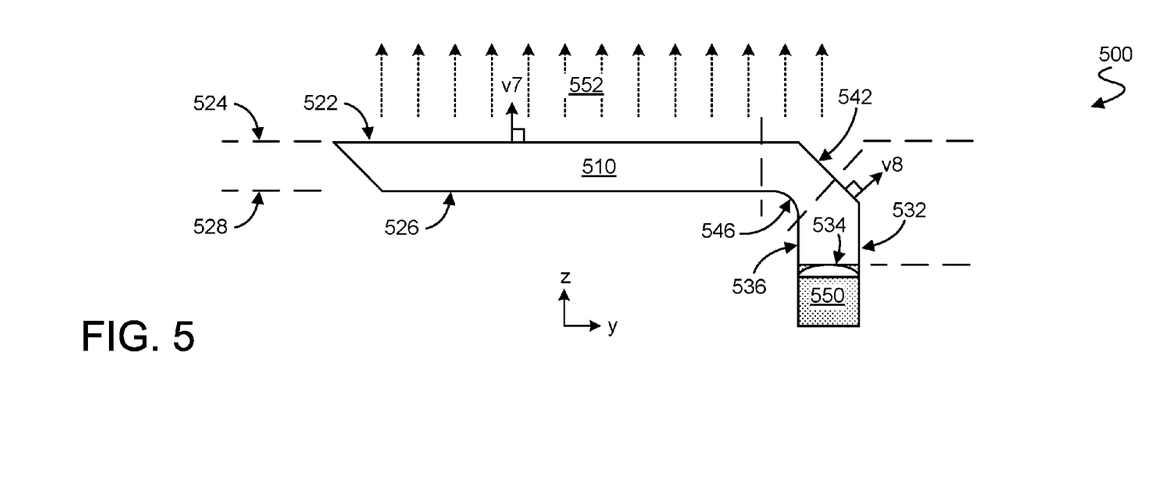
FIG. 5 is a side view of a system to direct light in a light guide according to an embodiment.

FIG. 5 shows features of a system 500 for redirecting light according to another embodiment. Functionality of system 500 may be provided by operations of method 200, for example. In an embodiment, system 500 includes features of system 100. System 500 is one example of an embodiment including a light guide which forms a right angle structure between an input portion thereof and an output portion thereof. In the illustrative embodiment shown, system 500 includes a light guide 510 and at least one light source 550 optically coupled thereto. Light guide 510 and light source 550 may correspond functionally to light guide 110 and light source 150, respectively. For example, light guide 510 may include three portions that correspond functionally to portions 120, 130, 140.

Light guide 510 may comprise any of a variety of light transmissive materials suitable to receive and direct light from light source 550. As illustrated in FIG. 5, an output portion of light guide 510 may comprise a surface region 522 and another surface region 526 which is opposite surface region 522. The output portion may have a generally planar geometry. For example, surface regions 522, 526 may extend each in a different respective one of two parallel planes (such as the illustrative planes 524, 528 shown). In such an embodiment, an input portion of light guide 510 may comprise a surface region 532 and another surface region 536 which is opposite surface region 532. Surface region 532, 536 may be parallel to one another at least in a region where a side 534 of the input portion adjoins each of surface region 532, 536. Light source 550 may be configured to direct light into the illustrative side 534 which extends between surface regions 532, 536. The output portion may be configured to output from surface region 522 at least a portion of such light, as represented by the illustrative light 552.

A deflector portion of light guide 510 may form one or more deflection structures between the input portion and the output portion—e.g., wherein a surface region 542 of the deflector portion extends between, and adjoins each of, surface regions 522, 532, the surface region 542 forming a deflection structure (e.g., a corner) between surface regions 522, 532. For example, a vector v7, normal to surface region 522, may be oblique to another vector v8 which is normal to part of surface region 532. Alternatively or in addition, another surface region 546 of the deflector portion (the surface region 546 opposite surface region 542) may adjoin each of surface regions 526, 536 and form another curved deflection (e.g., a curve) between surface regions 526, 536. In the example embodiment shown, light guide 510 provides a 90° angled structure between the input portion and the output portion—e.g., where respective portions of surface regions 532, 536 are variously perpendicular to planes 524, 528 and to surface regions 522, 526.

Figure 6A:
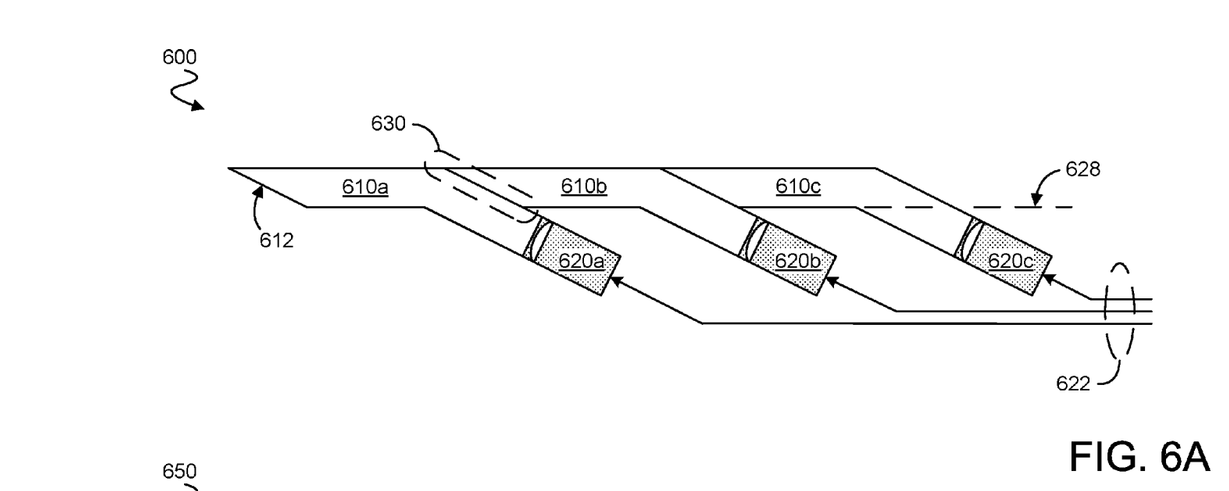
FIGS. 6A, 6B show cross-sectional side views each of a respective assembly including light guide structures according to a corresponding embodiment.

FIG. 6A shows features of an assembly 600 to redirect light according to an embodiment. Functionality of assembly 600 may be provided by operations of method 200, for example. In an embodiment, assembly 600 includes one or more light guides which each form a respective one or more deflection structures. Such one or more light guides may, for example, each include respective features of one of light guides 110, 310.

Assembly 600 is one example of an embodiment wherein respective portions of multiple light guides are arranged in sequence with one another on one side of a plane, where the respective portions are configured to variously direct light in a direction away from the plane. In such an embodiment, at least one such light guide may be optically coupled to receive light at a location on an opposite side of that plane—e.g., wherein such light propagates through the plane, and through a deflection portion of the light guide, to be output from the assembly.

In the example embodiment shown, assembly 600 includes light guides 610a, 610b, 610c which are optically coupled to receive light from light sources 620a, 620b, 620c, respectively. The particular number and arrangement of light guides 610a, 610b, 610c is merely illustrative, and assembly 600 may include more, fewer and/or differently configured light guides, in other embodiments. Although some embodiments are not limited in this regard, assembly 600 may further include or couple to one or more mechanical features (e.g., including a post, etc. to enhance mechanical integrity during assembly or operation) and/or control circuitry (not shown) which provides one or more signals—such as the illustrative control signals 622 shown—to control the generation of light by light sources 620a, 620b, 620c.

A plane (e.g., the illustrative plane 628 shown) may extend under or through respective portions of light guides 610a, 610b, 610c, which are to variously output light which propagates away from that plane. In such an embodiment, at least one of light guides 610a, 610b, 610c may be optically coupled to receive light via an interface which is located on the opposite side of that plane. By way of illustration and not limitation, an optical coupling of light guide 610a to light source 620a may be located on the opposite side of plane 628. Alternatively or in addition, an optical coupling of light guide 610b to light source 620b (and/or an optical coupling of light guide 610c to light source 620c) may be located on that same opposite side of plane 628. A deflection portion of one of light guides 610a, 610b, 610c (e.g., the deflection portion forming a corner surface structure) may result in one of light sources 620a, 620b, 620c being positioned vertically under one of light guides 610a, 610b, 610c. Such a light source may, for example, be positioned under a light guide other than any which receives light from that particular light source.

In some embodiments, one or more surface regions of a light guide (such as the illustrative sidewall surface 612 of light guide 610a) may be angled and/or otherwise shaped to conform to an adjoining surface region of another light guide. Such conformality between adjoining light guide structures may provide for an interface region—e.g., including the illustrative region 630 shown—where assembly 600 provides a flush or otherwise continuous surface from which light is to be emitted.

Figure 6B:
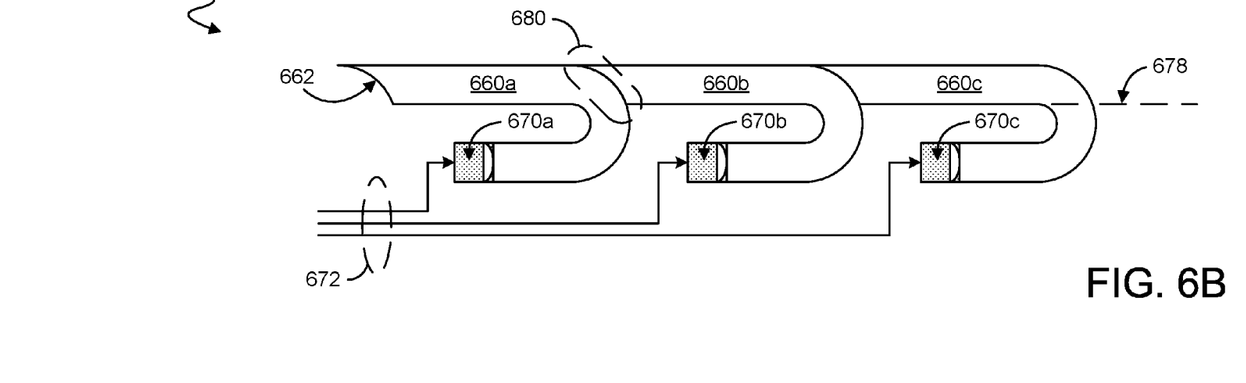

FIG. 6B shows features of an assembly 650 to redirect light according to another embodiment. Assembly 650 may have features of assembly 600 and/or may be provided by operations of method 200, for example. In an embodiment, assembly 650 includes one or more light guides which each form a respective one or more deflection structures. Such one or more light guides may, for example, each include respective features of one of light guides 110, 310.

In the example embodiment shown, assembly 650 includes light guides 660a, 660b, 660c which are optically coupled to receive light from light sources 670a, 670b, 670c, respectively. The particular number and arrangement of light guides 660a, 660b, 660c is merely illustrative, and assembly 650 may include more, fewer and/or differently configured light guides, in other embodiments. Although some embodiments are not limited in this regard, assembly 650 may further include or couple to control circuitry (not shown) which provides one or more signals—such as the illustrative control signals 672 shown—to control the generation of light by light sources 670a, 670b, 670c.

A plane (e.g., the illustrative plane 678 shown) may extend under or through respective portions of light guides 660a, 660b, 660c, which are to variously output light which propagates away from that plane. At least one of light guides 660a, 660b, 660c may be optically coupled to receive light via an interface which is located on the opposite side of that plane. By way of illustration and not limitation, an optical coupling of light guide 660a to light source 670a may be located on the opposite side of plane 678. Alternatively or in addition, an optical coupling of light guide 660b to light source 670b (and/or an optical coupling of light guide 660c to light source 670c) may be located on that same opposite side of plane 678. A deflection portion of one of light guides 660a, 660b, 660c (e.g., the deflection portion forming a curved surface structure) may result in one of light sources 670a, 670b, 670c being positioned vertically under one of light guides 660a, 660b, 660c.

In some embodiments, one or more surface regions of a light guide (such as the illustrative sidewall surface 662 of light guide 660a) may be curved and/or otherwise shaped to conform to an adjoining surface region of another light guide. Such conformality between adjoining light guide structures may provide for an interface region—e.g., including the illustrative region 680 shown—where assembly 650 provides a flush or otherwise continuous surface from which light is to be emitted.

Figure 7:
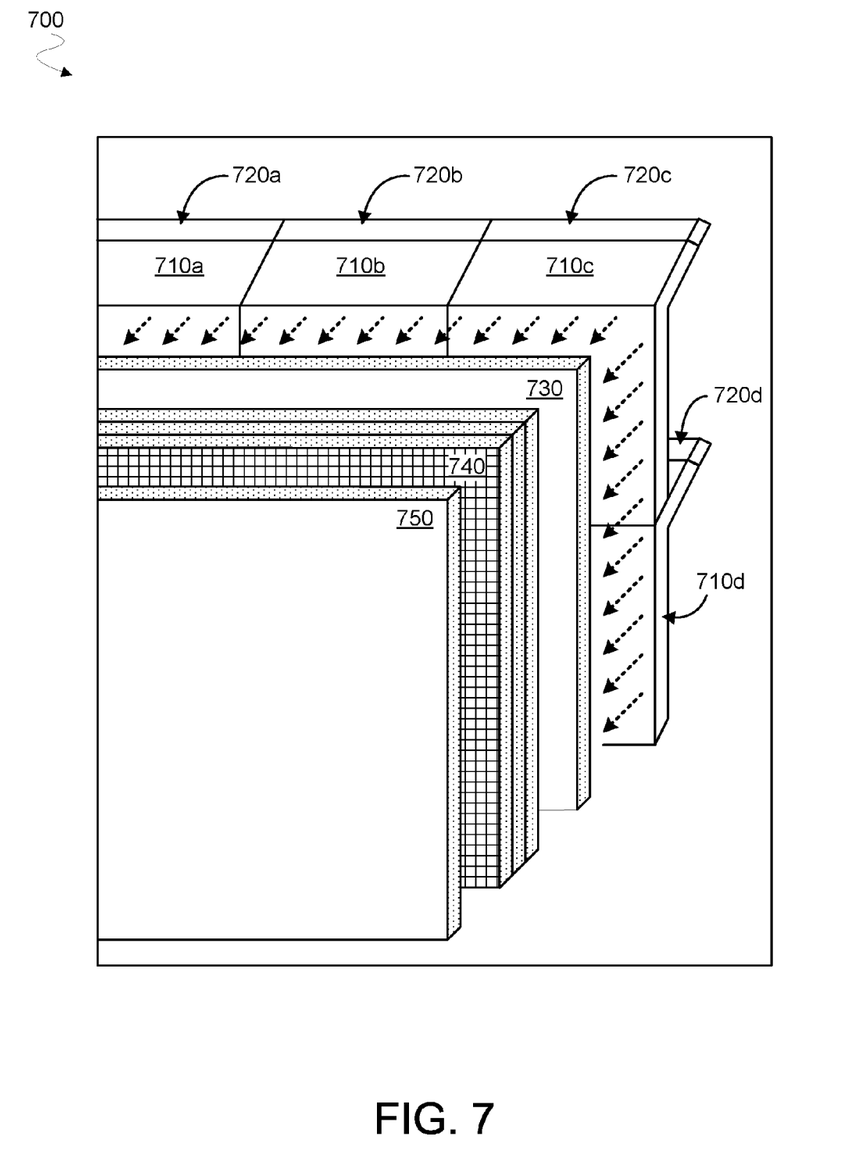
FIG. 7 is a perspective view of a display device including an assembly including light guide structures according to an embodiment.

FIG. 7 illustrates features of a flat panel display 700 including one or more light guides according to an embodiment. The one or more light guides may each include respective features of one of light guides 110, 310, for example. Functionality of flat panel display 700 may include or otherwise be based on operations of method 200. In some embodiments, flat panel display 700 includes multiple light guides having features of assembly 600 or assembly 650.

Flat panel display 700 may be configured to function, for example, as a computer monitor, laptop display, tablet display, smart phone display, television or any of various other display devices. In the illustrative embodiment shown, flat panel display 700 includes a liquid crystal display (LCD) screen that utilizes backlighting in conjunction with an array of liquid crystal display pixels. However, flat panel display 700 may include any of various other architectures wherein an array of display pixels is configured to receive backlight illumination with which an image is to be displayed.

Flat panel display 700 is one example of an embodiment that includes multiple light sources each optically coupled to provide light to a respective light guide of a light guide assembly. For at least one such light guide, a portion of the light guide may form one or more deflection structures, thereby enabling an edgewise illumination of the light guide by a light source that is set behind (e.g., offset from) a front face of the light guide assembly.

In the illustrative embodiment shown, a light guide assembly includes light guides 710a-710d and respective light sources 720a-720d variously coupled optically thereto. Deflection structures formed by at least one such light guide (e.g., including light guide 710d) may allow for one or more light sources to be positioned behind the light guide assembly—e.g., wherein light source 720d is located behind one of light guides 710a-710d in a region other than the periphery of the overall light assembly. In providing deflection structures of a light guide, some embodiments variously facilitate edgewise illumination of a light guide using a light source that is set behind an output portion of that light guide.

In the example embodiment of flat panel display 700, light output from the light guide assembly may be subsequently propagate through successive layers of a stack including a pixel array. By way of illustration and not limitation, such light may pass through a vertical polarizer layer 730 and into a stack 740 which includes an array of LCD pixel element. Stack 740 may, for example, include some or all of a first glass plate, a liquid crystal material layer, a color absorbing filter layer and a second glass plate. LCD pixel elements of stack 740 may be variously manipulated—e.g., according to conventional techniques—to allow varying amounts and/or wavelengths of light to create a particular image. In an embodiment, light passing from stack 740 may further pass through one or more other structures, such as the illustrative horizontal polarizer layer 750 shown.

Figure 8:
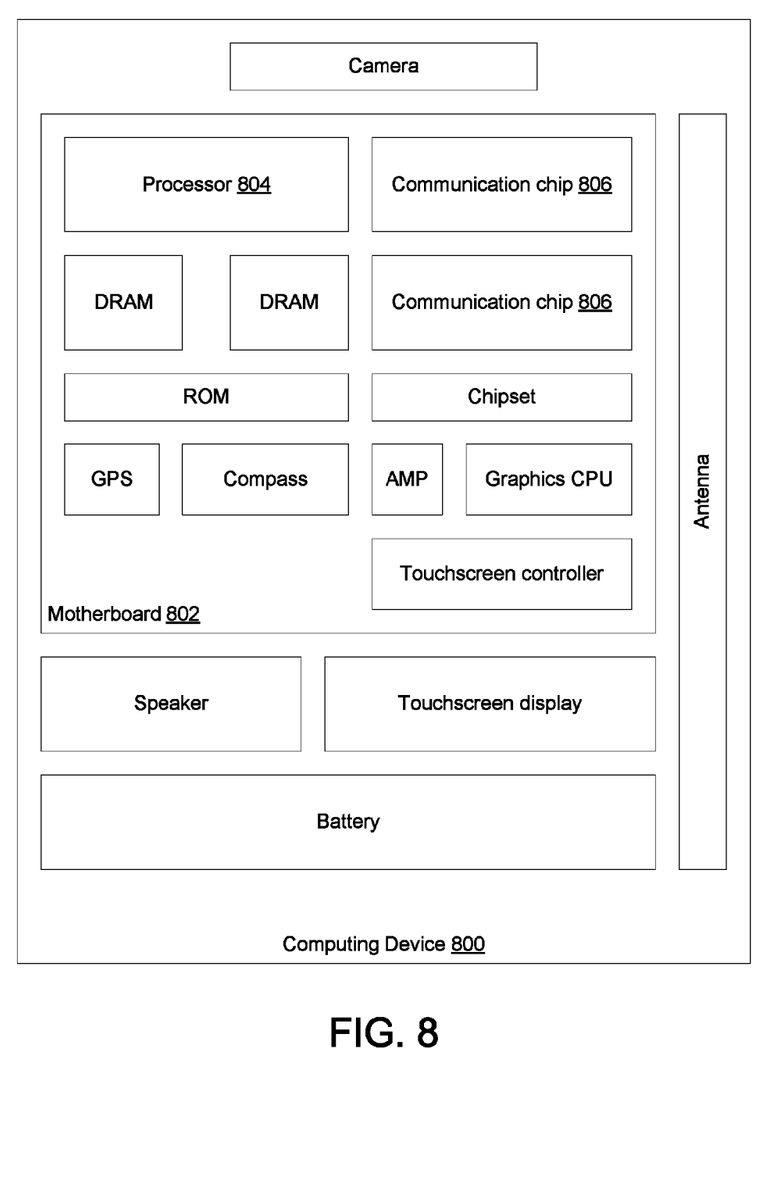
FIG. 8 is a functional block diagram illustrating elements of a computing device in accordance with one embodiment.

FIG. 8 illustrates a computing device 800 in accordance with one embodiment. The computing device 800 houses a board 802. The board 802 may include a number of components, including but not limited to a processor 804 and at least one communication chip 806. The processor 804 is physically and electrically coupled to the board 802. In some implementations the at least one communication chip 806 is also physically and electrically coupled to the board 802. In further implementations, the communication chip 806 is part of the processor 804.

Depending on its applications, computing device 800 may include other components that may or may not be physically and electrically coupled to the board 802. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 806 enables wireless communications for the transfer of data to and from the computing device 800. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 806 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 800 may include a plurality of communication chips 806. For instance, a first communication chip 806 may be dedicated to shorter range wireless communications such as Wi-Fi and Bluetooth and a second communication chip 806 may be dedicated to longer range wireless communications such as GPS, EDGE, GPRS, CDMA, WiMAX, LTE, Ev-DO, and others.

The processor 804 of the computing device 800 includes an integrated circuit die packaged within the processor 804. The term "processor" may refer to any device or portion of a device that processes electronic data from registers and/or memory to transform that electronic data into other electronic data that may be stored in registers and/or memory. The communication chip 806 also includes an integrated circuit die packaged within the communication chip 806.

In various implementations, the computing device 800 may be a laptop, a netbook, a notebook, an ultrabook, a smartphone, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. In further implementations, the computing device 800 may be any other electronic device that processes data.

Some embodiments may be provided as a computer program product, or software, that may include a machine-readable medium having stored thereon instructions, which may be used to program a computer system (or other electronic devices) to perform a process according to an embodiment. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

Figure 9:
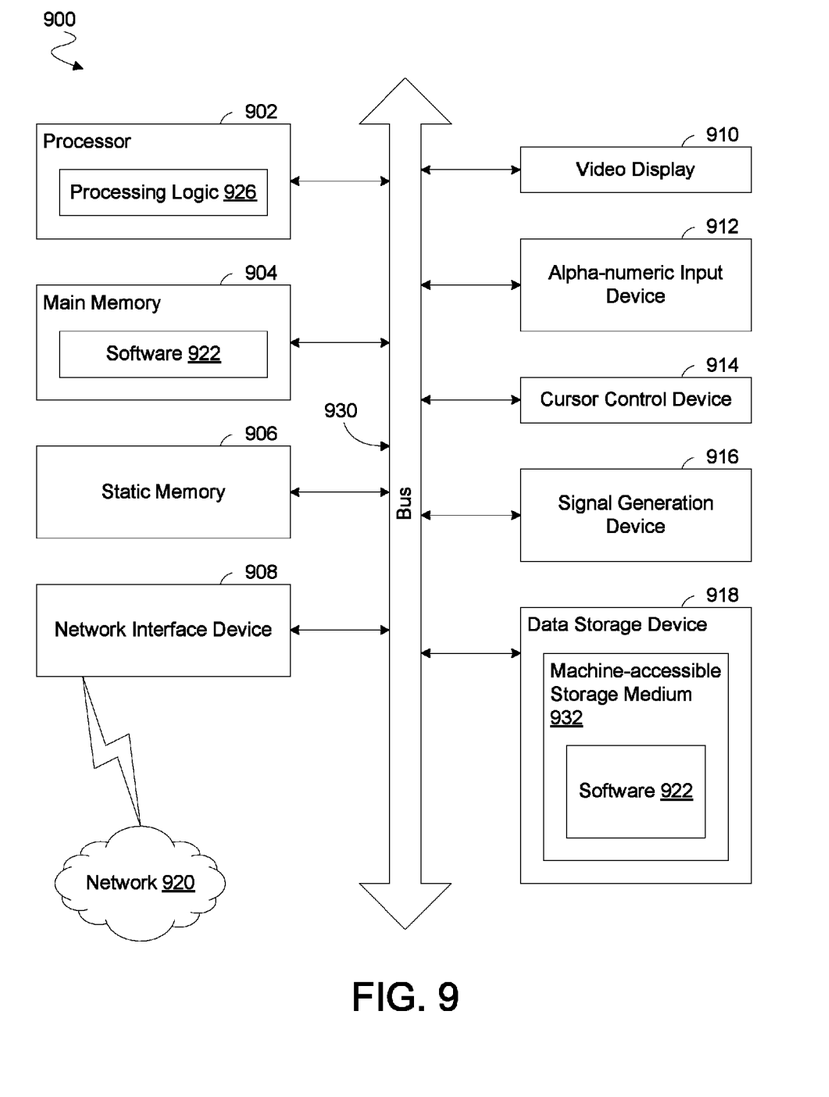
FIG. 9 is a functional block diagram illustrating elements of an exemplary computer system, in accordance with an embodiment.

FIG. 9 illustrates a diagrammatic representation of a machine in the exemplary form of a computer system 900 within which a set of instructions, for causing the machine to perform any one or more of the methodologies described herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies described herein.

The exemplary computer system 900 includes a processor 902, a main memory 904 (e.g., read-only memory (ROM), flash memory, dynamic random access memory (DRAM) such as synchronous DRAM (SDRAM) or Rambus DRAM (RDRAM), etc.), a static memory 906 (e.g., flash memory, static random access memory (SRAM), etc.), and a secondary memory 918 (e.g., a data storage device), which communicate with each other via a bus 930.

Processor 902 represents one or more general-purpose processing devices such as a microprocessor, central processing unit, or the like. More particularly, the processor 902 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 902 may also be one or more special-purpose processing devices such as an application specific integrated circuit (ASIC), a field programmable gate array (FPGA), a digital signal processor (DSP), network processor, or the like. Processor 902 is configured to execute the processing logic 926 for performing the operations described herein.

The computer system 900 may further include a network interface device 908. The computer system 900 also may include a video display unit 910 (e.g., a liquid crystal display (LCD), a light emitting diode display (LED), or a cathode ray tube (CRT)), an alphanumeric input device 912 (e.g., a keyboard), a cursor control device 914 (e.g., a mouse), and a signal generation device 916 (e.g., a speaker).

The secondary memory 918 may include a machine-accessible storage medium (or more specifically a computer-readable storage medium) 932 on which is stored one or more sets of instructions (e.g., software 922) embodying any one or more of the methodologies or functions described herein. The software 922 may also reside, completely or at least partially, within the main memory 904 and/or within the processor 902 during execution thereof by the computer system 900, the main memory 904 and the processor 902 also constituting machine-readable storage media. The software 922 may further be transmitted or received over a network 920 via the network interface device 908.

While the machine-accessible storage medium 932 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any of one or more embodiments. The term "machine-readable storage medium" shall accordingly be taken to include, but not be limited to, solid-state memories, and optical and magnetic media.

In one implementation, a device comprises one or more light sources, and a light guide optically coupled to the one or more light sources, the light guide including a first portion configured to receive light from the one or more light sources, a second portion configured to output from the light guide at least a portion of the light, and a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region.

In one embodiment, the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region. In another embodiment, the first direction is opposite the second direction. In another embodiment, the first deflection structure includes a first corner which forms an obtuse angle. In another embodiment, the first deflection structure includes a first curve. In another embodiment, the first curve forms a one hundred and eighty degree (180°) bend. In another embodiment, one or more surface regions of the first portion each have a respective reflective coating disposed thereon. In another embodiment, one or more surface regions of third portion each have a respective reflective coating disposed thereon. In another embodiment, the second surface region extends in a first plane and a third surface region of the second portion extends in a second plane parallel to the first plane, wherein a sidewall surface of the second portion extends between the first plane and the second plane, wherein the sidewall surface is curved or oblique to the first plane.

In another implementation, a method comprises forming a light guide including a first portion, a second portion and a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region. The method further comprises optically coupling a light source to the light guide via the first portion, wherein the second portion is optically coupled to output from the light guide light which is provided by the light source.

In one embodiment, the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region. In another embodiment, the first direction is opposite the second direction. In another embodiment, the first deflection structure includes a first corner which forms an obtuse angle. In another embodiment, the first deflection structure includes a first curve. In another embodiment, the first curve forms a one hundred and eighty degree (180°) bend. In another embodiment, one or more surface regions of the first portion each have a respective reflective coating disposed thereon. In another embodiment, one or more surface regions of third portion each have a respective reflective coating disposed thereon. In another embodiment, the second surface region extends in a first plane and a third surface region of the second portion extends in a second plane parallel to the first plane, wherein a sidewall surface of the second portion extends between the first plane and the second plane, wherein the sidewall surface is curved or oblique to the first plane. In another embodiment, the method further comprises optically coupling the light guide to a display stack including a pixel array. In another embodiment, the method further comprises providing light from the light source to the light guide, and operating the pixel array to generate an image with light output from the second portion of the light guide.

In another implementation, a system comprises multiple light sources including a first light source, multiple light guides each optically coupled to a respective one of the light sources, the multiple light guides including a first light guide comprising a first portion configured to receive light from the first light source, a second portion to output from the first light guide at least a portion of the light, and a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region. The system further comprises a liquid crystal display (LCD) screen optically coupled to receive the portion of the light.

In one embodiment, the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region. In another embodiment, the first direction is opposite the second direction. In another embodiment, the first deflection structure includes a first corner which forms an obtuse angle. In another embodiment, the first deflection structure includes a first curve. In another embodiment, the first curve forms a one hundred and eighty degree (180°) bend. In another embodiment, one or more surface regions of the first portion each have a respective reflective coating disposed thereon. In another embodiment, one or more surface regions of third portion each have a respective reflective coating disposed thereon. In another embodiment, the second surface region extends in a first plane and a third surface region of the second portion extends in a second plane parallel to the first plane, wherein a sidewall surface of the second portion extends between the first plane and the second plane, wherein the sidewall surface is curved or oblique to the first plane.

Techniques and architectures for providing illumination with a display are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A device comprising:
   one or more light sources; and
   a light guide optically coupled to the one or more light sources, the light guide including:
      a first portion configured to receive light from the one or more light sources;
      a second portion configured to output from the light guide at least a portion of the light; and
      a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region.

2. The device of claim 1, wherein the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region.

3. The device of claim 1, wherein the first direction is opposite the second direction.

4. The device of claim 1, wherein the first deflection structure includes a first corner which forms an obtuse angle.

5. The device of claim 1, wherein the first deflection structure includes a first curve.

6. The device of claim 5, wherein the first curve forms a one hundred and eighty degree (180°) bend.

7. The device of claim 1, wherein one or more surface regions of the first portion each have a respective reflective coating disposed thereon.

8. The device of claim 1, wherein one or more surface regions of third portion each have a respective reflective coating disposed thereon.

9. The device of claim 1, wherein the second surface region extends in a first plane and a third surface region of the second portion extends in a second plane parallel to the first plane, wherein a sidewall surface of the second portion extends between the first plane and the second plane, wherein the sidewall surface is curved or oblique to the first plane.

10. A method comprising:
    forming a light guide including a first portion, a second portion and a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region; and
    optically coupling a light source to the light guide via the first portion, wherein the second portion is optically coupled to output from the light guide light which is provided by the light source.

11. The method of claim 10, wherein the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region.

12. The method of claim 10, wherein the first direction is opposite the second direction.

13. The method of claim 10, wherein the first deflection structure includes a first corner which forms an obtuse angle.

14. The method of claim 10, wherein the first deflection structure includes a first curve.

15. The method of claim 10, further comprising optically coupling the light guide to a display stack including a pixel array.

16. The method of claim 15, further comprising:
providing light from the light source to the light guide; and
operating the pixel array to generate an image with light output from the second portion of the light guide.

17. A system comprising:
multiple light sources including a first light source;
multiple light guides each optically coupled to a respective one of the light sources, the multiple light guides including a first light guide comprising:
a first portion configured to receive light from the first light source;
a second portion to output from the first light guide at least a portion of the light; and
a third portion disposed between the first portion and the second portion, wherein the third portion forms a first deflection structure which adjoins and extends between a first surface region of the first portion and a second surface region of the second portion, wherein a first direction of a first vector normal to the first surface region is oblique to, or opposite to, a second direction of a second vector normal to the second surface region; and
a liquid crystal display (LCD) screen optically coupled to receive the portion of the light.

18. The system of claim 17, wherein the third portion forms a second deflection structure which adjoins and extends between a third surface region of the first portion and a fourth surface region of the second portion, wherein a third direction of a third vector normal to the third surface region is oblique to, or opposite to, a fourth direction of a fourth vector normal to the fourth surface region.

19. The system of claim 17, wherein the first direction is opposite the second direction.

20. The system of claim 17, wherein the first deflection structure includes a first corner which forms an obtuse angle.

21. The system of claim 17, wherein the first deflection structure includes a first curve.

* * * * *